United States Patent [19]
Andermo et al.

[11] Patent Number: 5,670,887
[45] Date of Patent: Sep. 23, 1997

[54] METHOD AND APPARATUS FOR FAST SAMPLING IN CAPACITIVE POSITION TRANSDUCERS

[75] Inventors: Nils Ingvar Andermo, Kirkland; Patrick H. Mawet, Snohomish; Karl G. Masreliez, Bellevue, all of Wash.

[73] Assignee: Mitutoyo Corporation, Kanagawa-ken, Japan

[21] Appl. No.: 634,094

[22] Filed: Apr. 17, 1996

[51] Int. Cl.⁶ .................................................. G01R 27/26
[52] U.S. Cl. .......................... 324/684; 324/662; 324/681; 324/660; 340/870.37
[58] Field of Search ........................ 340/870.37; 73/724; 324/684, 681, 679, 676, 662, 660

[56] References Cited

U.S. PATENT DOCUMENTS 3,668,672 6/1972 Parnell ............................... 324/660
4,837,500 6/1989 Abbringh ........................... 324/660
5,028,876 7/1991 Cadwell ............................. 324/660

*Primary Examiner*—Ernest F. Karlsen
*Assistant Examiner*—Jose M. Solis
*Attorney, Agent, or Firm*—Oliff & Berridge

[57] ABSTRACT

The fast sampling method for taking a position measurement with an electronic measurement system incorporating a capacitive position transducer of this invention allows such capacitive position transducers to be used in contaminant filled environments, such as on a shop floor or in the outdoors. By sampling the output signals within 25 ns–35 ns from when the input signals were applied to the capacitive position transducer, the adverse effects of resistive contamination can be avoided.

29 Claims, 9 Drawing Sheets

METHOD AND APPARATUS FOR FAST SAMPLING IN CAPACITIVE POSITION TRANSDUCERS

BACKGROUND OF THE INVENTION

1. Field of the Invention

This invention relates to methods and devices for making capacitive positioning transducers less sensitive to contamination. In particular, this invention relates to methods and devices for increasing the sampling speed of capacitive position transducers to make them less sensitive to contamination.

2. Description of Related Art

Capacitive position transducers, such as those used in calipers, linear scales and the like, are well known in the art. Capacitive position transducers are described in, for example, U.S. Pat. Nos. 4,420,754, 4,870,013, 4,879,508 and 5,023,559. Previously, the usefulness of such calipers and linear scales incorporating capacitive position transducers was limited to relatively clean environments.

In particular, using such calipers and linear scales in highly contaminated areas, such as on shop floors or in outdoors environments, has been considered inappropriate. This is due to the adverse effects contaminants, such as water, cutting oil, and other fluids present on a shop floor, a construction site or the like, have on the accurate operation of the capacitive position transducer.

A capacitive position transducer is schematically shown in FIG. 1. As shown in FIG. 1, a capacitive position transducer 50 comprises a slide 60 and a scale 70. The slide 60 is movable relative to the scale 70 along a measurement axis. In FIG. 1, the measurement axis extends into and out of drawing.

The slide 60 includes electrodes 61 and 62 of the slide 60, which are connected to a signal generator 80 and a signal processor 90, respectively. Signals are input from the signal generator 80 to the first transmitter electrode 61 of the slide 60. Signals are output from the second receiver electrode 62 of the slide 60 to the signal processor 90. The first transmitter electrode 61 and the second receiver electrode 62 are each covered by an insulating layer 63. The first transmitter electrode 61 is also electrically isolated from the second receiver electrode 62.

The scale 70 includes a first receiver electrode 71 and a second transmitter electrode 73. The first receiver electrode 71 is electrically connected by a circuit path 72 to the second transmitter electrode 73. The first receiver electrode 71 and the second transmitter electrode 73 are each covered by an insulating layer 74. The slide 60 is positioned adjacent to the scale 70 such that a gap 64 is formed between the slide electrodes 61 and 62, and the scale electrodes 71 and 73. The gap 64 is generally as small as possible, and can be nonexistent.

In general, the slide 60 is positioned adjacent to the scale 70 such that the transmitter electrode 61 is generally adjacent to the first receiver electrode 71, while the second transmitter electrode 73 is generally adjacent to the second receiver electrode 62. It should be appreciated that the positions of the first transmitter electrode 61, the first receiver electrode 71, the second transmitter electrode 73, and the second receiver electrode 62 can be reversed. In that case, the first transmitter electrode 61 and the second receiver electrode 62 are formed on the scale 70, while the first receiver electrode 71 and the second transmitter electrode 73 are formed on the slide 60.

In operation, an input signal generated by the signal generator 80 is input to the first transmitter electrode 61. Because the first receiver electrode 71 is generally adjacent to the first transmitter electrode 61, the signal output by the signal generator 80 is capacitively coupled from the first transmitter electrode 61 to the first receiver electrode 71.

This signal is then electrically transmitted from the first receiver electrode 71 to the second transmitter electrode 73 over the circuit path 72. Because the second receiver electrode 62 is generally adjacent to the second transmitter electrode 73, the signal capacitively coupled onto the first receiver electrode 71 is in turn capacitively coupled onto the second receiver electrode 62. The signal output from the second receiver electrode is modulated from the signal input from the signal generator 80 by the position of the slide 60 relative to the scale 70, due to the variable capacitive coupling between the slide electrodes 61 and 62 and the scale electrodes 71 and 73. This output signal is then output by the second receiver electrode 62 to the signal processor 90.

The signal processor 90 includes at least a sample and hold circuit 91 and other signal processing circuitry 95. The output signal input from the second receiver electrode 62 is input to a first pole of a switch 92 of the sample hold circuit 91. The switch 92 controlled by control signal output on a control line 93 from the other signal processing circuitry 95. When the switch 92 is closed, a capacitor 94 of the sample and hold circuit 91 is charged. The charge on the capacitor 94 is then held when the switch 92 is subsequently opened.

In particular, the input signal from the signal generator 80 output to the first transmitter electrode 61 is a square wave pulse signal, such as that shown in FIG. 2. The pulse signal generally has a period T between rising edges and an input voltage amplitude of $V_I$. When no contaminants are present in the capacitive position transducer 50 shown in FIG. 1, the voltage amplitude of the output signal from the capacitive position transducer appearing on the first pole of the switch 92 of the sample and hold circuit 91 will be maintained at a constant voltage amplitude for the time period T' corresponding to the positive voltage portion of the pulse. The actual voltage amplitude of the output signal, however, will depend upon the geometric configuration of the capacitive position transducer 50. When no contaminant is present in the gap 64 between the slide 60 and the scale 70, the uncontaminated voltage amplitude $V_{NC}$ of the output signal is relatively constant during the time period T'. Thus, an accurate measurement of the voltage amplitude of the output signal may be taken at any time during the time period T'. Thus, in a contaminate-free capacitive position transducer 50, the design and operation of the sample and hold circuit 91 has no critical timing requirements.

However, when a contaminant, such as water, cutting oil, or some other liquid becomes lodged in the gap 64 between the slide 60 of the scale 70, the output signal output from the second receiver electrode 62 no longer matches the input square wave shown in FIG. 2. Rather, when contaminants are present, the output signal output from the second receiver electrode 62 is generally shown in FIG. 3.

As shown in FIG. 3, while the voltage amplitude of the output signal O output from the second receiver electrode 62 rises to $V_1$, which is close to the non-contaminated voltage amplitude $V_{NC}$, the voltage amplitude of the output signal O from the second receiver electrode 62 quickly decays. Thus, if the voltage amplitude of the output signal O is measured at a first time $t_1$, the voltage amplitude $V_1$ of the output signal at that time is nearly equal to the uncontaminated output voltage amplitude $V_{NC}$ of the output signal. However, if the voltage amplitude of the output signal O is not measured until time $t_2$, the measured voltage amplitude of the output signal O will have an amplitude of $V_2$.

The difference between the amplitude $V_1$ and the amplitude $V_2$ has two primary detrimental effects. First, the signal-to-noise ratio is generally reduced when the gap between the scale 70 and the slide 60 is relatively uniformly contaminated. In general, capacitive position transducers indicate the relative position of the slide 60 on the scale 70 based on the amplitude or phase of the signal output by the second transmitter electrode 62 relative to the amplitude or phase of the input signal input to the first transmitter electrode 61.

For example, as shown in FIG. 4, when no contamination is present in the gap 64, the voltage amplitude of the output signal output from the second receiver electrode 62 will range from $V_0+V_{NC}$ to $V_0-V_{NC}$, depending on the position of the slide 60 relative to the scale 70. Thus, when no contaminants are present in the gap 64, the output signal $O_1$ output from the second receiver electrode 62 fluctuates from $V_0+V_{NC}$ to $V_0-V_{NC}$ when the slide 60 of the capacitive transducer 50 is moved relative to the slide 70 along the measurement axis from a displacement $D_x$ to a displacement $D_x+D_y$.

However, when the gap 64 of the capacitive position transducer 50 is uniformly contaminated, such as by a fluid such as water, cutting oil or the like, the voltage amplitude of the output signal from the second receiver electrode 62 is reduced. For example, assuming the output signal is sampled uniformly at the time $t_2$ (of FIG. 3) after the pulse is input from the signal generator 80 to the first transmitter electrode 61, the output signal $O_2$ is obtained as the slide 60 is moved relative to the scale 70. In particular, the output signal $O_2$ ranges from $V_0+V_C$ to $V_0-V_C$ when the slide 60 is moved relative to the scale 70 along the measurement axis from the displacement $D_x$ to the displacement $D_x+D_y$, where the amplitude $V_C$ of the signal variation is smaller than the amplitude $V_{NC}$ of the signal variation of the non-contaminated transducer.

Therefore, because the change in the voltage amplitude of the output signal $O_2$ is reduced for each incremental change of the position of the slide 60 relative to the scale 70 when contamination is present relative to the change in the amplitude of the output signal $O_1$, the signal contrast of the output signal from the second receiver electrode 62 is necessarily reduced. As discussed above, reducing the signal contrast of the output signal makes precise measurements more difficult to make and makes measurement errors more likely.

Furthermore, as shown in FIG. 3, the voltage amplitude of the output signal $O_2$ output from the second receiver electrode 62 when contamination is present continues to decay after $t_1$. Thus, if the output signal $O_2$ is sampled after time $t_1$, the voltage amplitude of the output signal $O_2$ may not be distinguishable over the background noise. Thus, the output signal $O_2$ output from the second receiver electrode 62 will produce little or no useful information.

In the first detrimental effect described above, the contamination between the slide 60 and the scale 70 is assumed to be uniform. The second detrimental effect occurs when the contamination is unevenly distributed between the slide 60 and the scale 70. Such uneven contamination can occur because a relatively uniform contaminant is unevenly distributed throughout the gap 64. Such uneven contamination also occurs when the contaminant is either not homogeneous, or includes multiple constituents, where each constituent contaminant has different electrical characteristics or dielectric constants.

FIG. 5 shows the resulting output signals when the contaminant is unevenly distributed within the gap 64 between the slide 60 and the scale 70 relative to the output signal when no contamination is present. In particular, in FIG. 5, like FIG. 4, the output signal $O_1$ is output from the second receiver electrode 62 when no contamination is present. In contrast, the output signal $O_3$ is the output signal output from the second receiver electrode 62 when the contamination is unevenly distributed within the gap 64.

As shown in FIG. 5, the voltage amplitudes of the relative displacements $D_1$ and $D_3$ of the slide 60 on the scale 70 correspond to positions where a maximum amount of overlap occurs between the first transmitter electrode 61 and the first receiver electrode 71. The displacement $D_2$ of the slide 60 relative to the scale 70 corresponds to the position where a minimum amount of overlap occurs between the first transmitter electrode 61 and the first receiver electrode 71. When no contamination is present in the gap 64, the capacitive position transducer 50 outputs the output signal $O_1$ with a voltage magnitude of $V_{NC}$ at the displacements $D_1$ and $D_3$, and a voltage magnitude of $-V_{NC}$ at the displacement $D_2$.

In contrast, when the contaminants are unevenly distributed within the gap 64, the magnitude of the output voltage $O_3$ will vary as a function of both the amount and the composition of the contaminants present as well as the relative position between the slide 60 and the scale 70. For example, if there are few contaminants between the first transmitter output 61 and the first receiver electrode 71 when the slide 60 is at the displacement $D_1$ relative to the scale 70, the output voltage of the output signal $O_3$ will be very close to the amplitude of the output signal $O_1$ at the displacement $D_1$. In contrast, if there is a large quantity of contaminants in the gap 64 between the first transmitter electrode and the first receiver electrodes 71 when the slide 60 is at the displacement $D_2$ relative to the scale 70, the magnitude of the voltage signal $O_3$ will be very different from the corresponding voltage on the uncontaminated output signal $O_1$.

While an evenly distributed and homogenous contaminate will cause measurement problems in the capacitive position transducer 50, uneven contaminants pose additional measurement problems. That is, because the contaminants, when unevenly distributed between only some of the first transmitter electrodes 61 and the second receiver electrodes 71 and/or between only some of the second transmitter electrodes 73 and the second receiver electrodes 62 of the capacitive transducer 50, cause output signal output from these receiver electrodes 71 and 62 to vary disproportionately relative to those receiver electrodes 62 and 71 where no contamination is present.

During operation, the capacitive position transducer 50 sums the output from a number of receiver electrodes 62. This process produces a net output which has both a magnitude and a phase angle when represented by a phasor diagram. By observing the angle of the resultant phasor, the signal processor 90 of the capacitive position transducer 50 determines the position of the slide 60 relative to the scale 70. When the contaminants are unevenly distributed, the relative voltage amplitude of the resulting output signal $O_3$ output from each second receiver electrode 62 varies randomly depending on the amount and type of contaminant in the gap 64 adjacent each second receiver electrode 62. Thus, the resulting sum of the amplitudes of the output signal from the various second receiver electrodes 62, the resulting output signal, will have an error which will degrade the measurement accuracy of the position transducer.

Thus, while an evenly distributed contaminate will primarily reduce the signal-to-noise ratio of the output signal $O_2$ output by the second receiver electrodes 62, unevenly distributed contaminants effect the position determination by causing the signal from one or more of the second receiver electrodes 62 to change disproportionately in response to changes in other ones of the second receiver electrodes 62, due to the contaminants.

The contaminants effect the capacitance of the capacitive position transducer 50. That is, the capacitance between the slide 60 and the scale 70 is dependent upon the gap 64 between the first and second transmitter electrodes 61 and 73 and the corresponding first and second receiver electrodes 71 and 62, the amount of overlapping area between the first and second transmitter electrodes 61 and 73 and the corresponding first and second receiver electrodes 71 and 62, and the dielectric constant of the material between the first and second transmitter electrodes 61 and 73 and the corresponding first and second receiver electrodes 71 and 62. In particular, if the dielectric constant of the material in the gap 64 increases, the capacitance between the particular first and second transmitter electrode 61 or 73 and the corresponding first and second receiver electrode 71 or 62 correspondingly increases. In turn, an increased capacitance causes the initial output voltage peak of the output signal O (See FIG. 3) to increase.

In particular, as shown in FIG. 6, there are four primary ways in which the voltage amplitude of the output signal output from the second receiver electrode 62 to the signal processor 90 may be effected by contaminants between a first and second transmitter electrode 61 or 73 and the corresponding first and second receiver electrode 71 or 62. As shown in FIG. 6, when there is a voltage loss due to contamination, but where the contamination does not significantly increase the capacitance, the resulting output signal generally corresponds to signal $O_4$. The signal $O_4$ generally corresponds to the output signal O shown in FIG. 3.

Where the contaminants cause an initial increase in voltage, and also cause a voltage loss, the resulting output signal generally corresponds to signal $O_5$. Where the dielectric constant of the contaminants between the slide 60 and the scale 70 do not result in a voltage loss, and also have no effect on initial voltage (i.e., when there is in effect (or in actuality) no contamination), the resulting output signal generally corresponds to signal $O_6$. Finally, where the contaminant does not cause a voltage loss but does increase the initial voltage of the output signal, the resulting output signal generally corresponds to $O_7$. Each of the contaminant-affected output signals $O_4$, $O_5$, and $O_7$ may create measurement errors in the position indication generated by the signal processor 90 from the output signal.

Accordingly, a capacitive position transducer which is able to avoid the loss of signal-to-noise ratio due to evenly distributed contaminants and which is able to avoid the measurement errors caused by unevenly distributed contaminants is highly desired, because such a transducer would no longer be restricted to relatively clean environments but could be used in relatively contaminant-filled filled environments, such as on shop floors and outdoors environments.

One such mechanical means for achieving a capacitive position transducer which is usable in a contaminant-filled environment is disclosed in U.S. Pat. No. 5,574,381, issued Nov. 12, 1996, herein incorporated by reference. In this application, the capacitive position transducer is sealed between the slide and scale of a caliper. However, such mechanical means for ensuring contaminants do not effect the operation of the capacitive position transducer are expensive. Such solutions also make the caliper more difficult to use and can fail in extremely dirty environments. Further, because the slide must still be able to move relative to the scale, contaminants, especially fluids, are difficult to effectively exclude using such seals.

Accordingly, a method for electronically avoiding the negative effects of contaminants would allow for unsealed calipers to be used in contaminant filled environments.

SUMMARY OF THE INVENTION

Accordingly, this invention provides a method and a device for operating a capacitive position transducer which avoids the detrimental effects of contamination between the slide and the scale of the transducer.

This invention further provides a method and a device for operating a capacitive position transducer which has an improved signal-to-noise ratio in the presence of contaminants in the transducer.

This invention also provides a method and a device for operating a capacitive position transducer which reduces measurement errors due to contaminants.

Accordingly, the method and the device for operating the capacitive position transducer of this invention includes supplying a drive signal to the capacitive position transducer and, within a prescribed time interval after supplying the drive signal, sampling the signal received from the capacitive position transducer, such that the received output signal is sampled before any signal decay effects on any signal path through the capacitive position transducer affect the signal. In particular, the predetermined time interval should be selected such that when the output signal is sampled within the predetermined time interval, at least 80% of the original signal contrast of the output signal is obtained. These and other features and advantages of this invention are described in, or are apparent from, the following detailed description of the preferred embodiments.

BRIEF DESCRIPTION OF THE DRAWINGS

The preferred embodiments of this invention will be described in detail, with reference to the following figures, wherein.

DETAILED DESCRIPTION OF THE PREFERRED EMBODIMENTS

Figure 7:
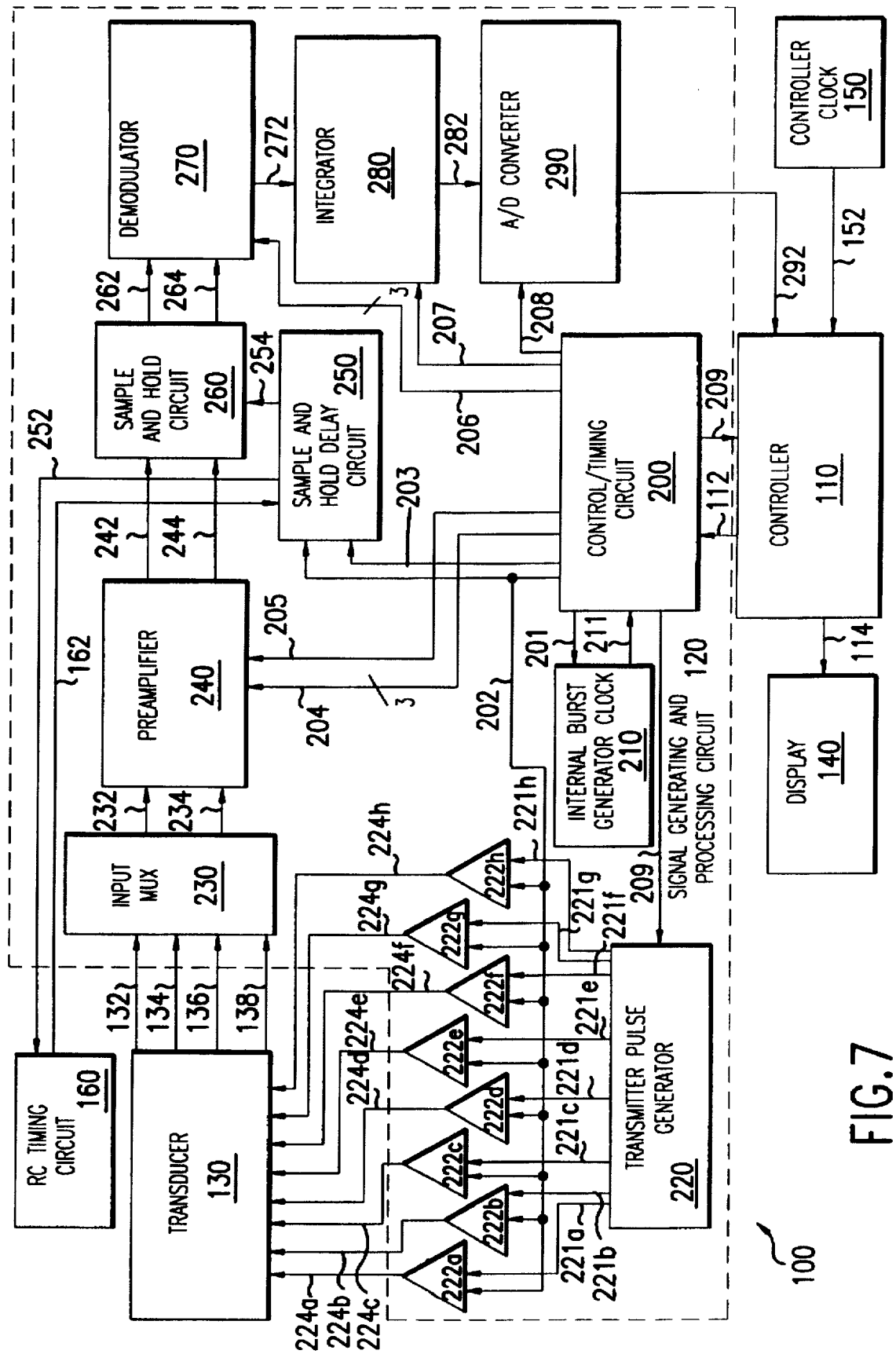
FIG. 7 shows a first preferred embodiment of the measurement system of this invention.

FIG. 7 shows a first preferred embodiment of an electronic measurement system 100 of this invention. As shown in FIG. 7, the electronic measurement system 100 comprises a controller 110, a signal generating and processing circuit 120, a transducer 130, a display 140, a controller clock 150, and an RC timing circuit 160. In particular, the controller clock 150 outputs clock signal on a signal line 152 to the controller 110. The controller 110 outputs control signals on the signal lines 112 to the signal generating and processing circuit 120. The signal generating and processing circuit 120 generates, based on the control signals supplied by the controller 110, a plurality of drive signals to the transducer 130. The transducer 130 then outputs a plurality of position indicating signals back to the signal generating and processing circuit 120.

The signal generating and processing circuit 120 samples the signals output from the transducer 130 based on the RC timing circuit 160. The signal generating and processing circuit 120, based on the sampled position indicating signals output from the transducer 130, generates a digital position indicating signal. The digital position indicating signal is output from the signal generating and processing circuit 120 on a signal line 292 to the controller 110.

The controller 110 then further processes the digital indicating signal and outputs a position signal on the signal line 114 to the display 140. The display 140 then displays the position indicated by the position signal to an operator.

The controller 110 shown in FIG. 7 is preferably implemented using a programmed microprocessor or microcontroller, and possibly one or more peripheral integrated circuit elements. The controller 110 can also be implemented on a programmed general purpose computer, a special purpose computer, and ASIC or other integrated circuit, hardwired electronic circuit such as a discrete element circuit, a programmed logic device such as a PLD, PLA or PAL or the like. In general, any device which is capable of generating the control signals described herein can be used to implement the controller 110.

The display 140 can be any standard CRT, LCD or LED visual display. In addition, the display 140 can be replaced by a connection to a further control system, such as a controller of a numerically controlled machine tool or the like, or a general purpose computer. In general, any device which could input the position signal output on the output line 114 and further process it can be used in place of the display 140.

As shown in FIG. 7, the signal generating and processing circuit 120 includes a control/timing circuit 200 which inputs the control signals output by the controller 110 on the signal lines 112. The control/timing circuit 200 processes the control signals received from the controller 110 and outputs control signals to the various elements of the signal generating and processing circuit 120.

In particular, an internal burst generator clock 210 receives a control signal from the control/timing circuit 200 on the signal line 210. When the internal burst generator clock 210 is activated, a high frequency (preferably 2 MHz) clock signal is generated by the internal burst generator clock 210 and is output to the control/timing circuit 200 over a signal line 211. U.S. provisional patent application Ser. No. 60/015,707, filed Apr. 17, 1996, discloses the controller clock in greater detail and is incorporated herein by reference.

The control/timing circuit 200 outputs pulse data on a signal line 209 to a transmitter pulse generator 220. The transmitter pulse generator 220 outputs driver signals on the signal lines 221a–221h based on the post data input over the signal line 209. Each of the signal lines 221a–221h are connected to one of a plurality transmitter drivers 222a–222h.

Also connected to each of the transmitter drivers 222a–222h is a signal line 202 from the control/timing circuit 200. The signal line 202 is also connected to a sample and hold delay circuit 250 of the signal generating and processing circuit 120. The synchronization signal output on the signal line 202 controls the transmitter drivers 222a–222h to provide proper modulation signals on the signal line 224a–224h connected to the transducer 130.

While eight modulation signals are input to the transducer 130 over the signal lines 224a–224h, any number of signals can be generated and input to the transducer 130 by the signal generating and processing circuit 120. Similarly, there may be fewer or more transmitter drivers 222 than those shown in FIG. 7. For example, the transducer 130 may require sixteen different modulation signals, rather than eight.

In general, as described above in reference to FIG. 1, the transducer 130 has a slide member which is movable relative to a scale member along a measurement axis. The signal lines 224 are connected to one or more capacitive transmitter electrodes formed on one of the slide member or the scale member. A capacitive transfer function between the slide member and the scale member of the transducer 130 modifies a signals input on the signal lines 224a–224h based on the relative or absolute position of the slide member relative to the scale member. A number of signal output lines 132–138 are connected to the capacitive receiver electrodes of the slide member or the scale member of the transducer 130. Generally, as described above, all of the input signal lines and the output signal lines will be connected to the same member of the transducer 130.

The output signal lines 132–138 from the transmitter 130 are connected to an input multiplexer 230 of the signal generating processing circuit 120. The input multiplexer selectively connects two of the input signal lines 132–138 to the output signal lines 232 and 234 connected to the pre-amplifier of 240. The pre-amplifier 240, based on the control signals output from the control/timing circuit 200 on the signal lines 204 and 205, amplifies the signals output from the input multiplexer 230 on the signal lines 232 and 234. The pre-amplifier 240 then outputs these amplified signals on the signal lines 242 and 244 to the sample and hold circuit 260.

The sample and hold circuit 260 samples the amplified output signals output on the signal lines 242 and 244 based on a control signal output on the signal line 254 from the sample and hold delay circuit 250.

Based on the control signals output from the control/timing circuit 200 to the sample and hold delay circuit 250, the sample and hold delay circuit 250 outputs a control signal to the RC timing circuit 160 on the signal line 252. The RC timing circuit 160 outputs a delayed control signal corresponding to the control signal output on the signal line 252 back to the sample and hold delay circuit 250 on the signal line 162.

The sample and hold delay circuit 250 outputs the control signal on the signal line 254 based on the synchronization signal output on the signal line 202 from the control/timing circuit 200 and the delayed control signal output on the signal line 162 from the RC timing circuit. The sample and hold delay circuit 250 further generates the control signal on the signal line 254 based on a second control signal output from the control/timing circuit 200 on the signal line 203.

Once the sample and hold circuit 260 has sampled the amplified output signals input on the signal lines 242 and 244, the held signals are output on the signal lines 262 and 264 to a demodulator 270. The control/timing circuit 200 also outputs a plurality of control signals on the signal lines 206 to the demodulator 270. The demodulator 270 demodulates the signals received from the sample and hold circuit 260 and outputs a demodulated signal on the signal line 272 to the integrator 280.

The integrator 280, based on a plurality of control signals output on the control lines 207 from the control/timing circuit 200, integrates a number of the demodulated signals output from the demodulator 270 on the signal line 272. The integrator 280 then outputs an integrated signal on the signal line 282 to an analog-to-digital (A/D) converter 290. Based on a control signal output from the control/timing circuit 200 on the signal line 208, the A/D converter 290 converts the integrated signal received from the integrator 280 on the signal line 282 to a digital signal. This digital signal is then output on the signal line 292 to the controller 110.

Figure 8:
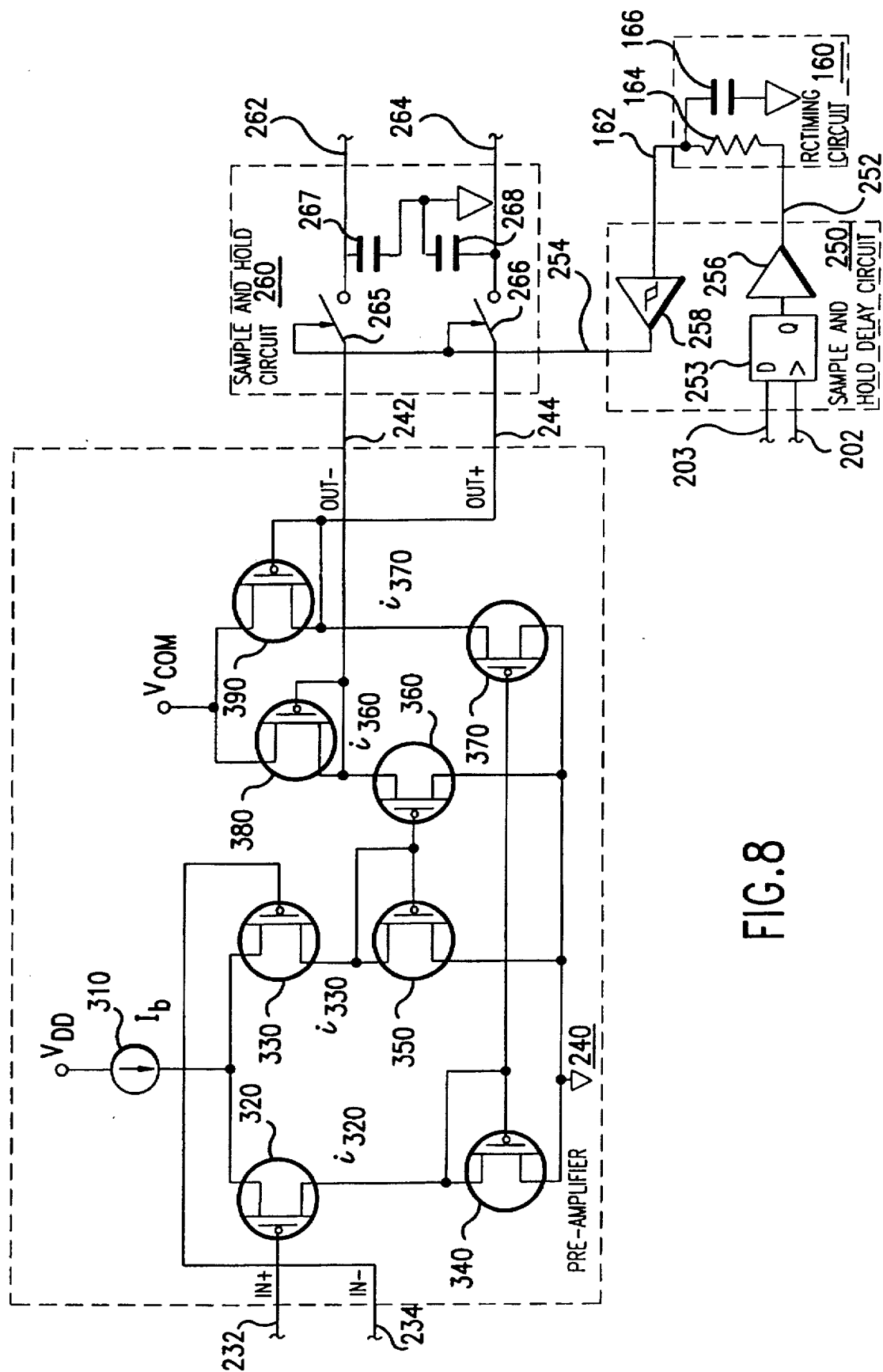
FIG. 8 shows in greater detail the pre-amplifier, the sample and hold circuit, the sample and hold delay circuit and the RC timing circuit of the measurement system of this invention.

FIG. 8 shows in greater detail the pre-amplifier 240, the sample and hold delay circuit 250, the RC timing circuit 160 and the sample and hold circuit 260. In particular, as shown in FIG. 8, the pre-amplifier 240 is a folded, differential common source amplifier. While one stage of such an amplifier is shown in FIG. 8, any number of stages could be used, as shown in U.S. patent application Ser. No. 08/634,097, filed Apr. 17, 1996 and herein incorporated by reference. As shown in FIG. 8, the signal line 232 is connected through the IN+ terminal of the pre-amplifier 240 to a gate of a first PMOS transistor 320. The other signal line 234 is connected through the IN− terminal to a gate of a second PMOS transistor 320. The sources of the first and second PMOS transistors 320 and 330 are connected to a common current source 310. The common current source 310 outputs a current $I_b$.

A drain of the first PMOS transistor 320 is connected to both a gate and a drain of a first NMOS transistor 340. Similarly, a drain of the second PMOS transistor 330 is connected to both a gate and a source of a second NMOS transistor 350. The gate of the second NMOS transistor 350 is also connected to a gate of a third NMOS transistor 360, while the gate of the first NMOS transistor 340 is also connected to a gate of a fourth NMOS transistor 370. A source of the fourth NMOS transistor 370 is connected to the signal line 244 through an OUT+ terminal of the pre-amplifier 240. A source of the third NMOS transistor 360 is similarly connected to the output signal line 242 through an OUT− terminal of the pre-amplifier 240. The drains of the first-fourth NMOS transistors 340–370 are connected to ground.

The source of the third NMOS transistor 360 is also connected to a gate and a drain of a third PMOS transistor 380. Similarly, the source of a fourth NMOS transistor 370 is also connected to a gate and a drain of a fourth PMOS transistor 390. The sources of the third PMOS transistor 380 and the fourth PMOS transistor 390 are connected to a common voltage $V_{COM}$.

Thus, the first and second PMOS transistors 320 and 330 form a differential common source amplifier. The first-fourth NMOS transistors 340–370 form a current mirror. The third and fourth PMOS transistors 380 and 390 form a load having the same transistor type as the differential common source amplifier formed by the first and second PMOS transistors 320 and 330.

The first and second PMOS transistors 320 and 330 forming the input of the pre-amplifier 240 are a classic PMOS differential pair. The output currents $I_{320}$ and $I_{330}$ of the transistors 320 and 330 are mirrored by the first-fourth NMOS transistors 340–370. Thus, the current of the differential input stage formed by the transistors 320 and 330 is:

$$I_{330}-I_{320}=G_{320}* (V_{in}-V_{IN-})$$

where $G_{320}$ is the transconductance of both the first PMOS transducer 320 and the second PMOS transducer 330. As described above, because the first and second PMOS transistors 320 and 330 are both P-type transistors, their transconductances are generally the same. This is because, although the transconductance is very dependent upon uncontrollable manufacturing process variables, the transistors 320 and 330 are both PMOS transistors, and therefore will be form during the same manufacturing processes. In particular, the uncontrollable manufacturing processes which affect the transconductance parameter $K'_P$ of the PMOS transistors 320 and 330, while uncontrollable, will be the same for both transistors.

That is, because the PMOS transistors 320 and 330 undergo the same manufacturing steps, the transconductance parameter $K'_P$ for each of the PMOS transistors 320 and 330 is affected to the same degree. Thus, the transconductance parameters of the PMOS transistors 320 and 330 are closely matched and their transconductances g are therefore generally the same. For the same reasons, the transconductances g of the first and second NMOS transistors 340 and 350 are generally the same. Likewise, the transconductances g of the third and fourth NMOS transistors 360 and 370 are generally the same. Finally, for the same reasons, the transconductances g of the third and fourth PMOS transistors 380 and 390 are generally the same.

In addition, the transconductances of the first-fourth NMOS transistors 340–370 of the current mirror are ratioed to increase the gain of the circuit. In particular, the transconductances of the third and fourth NMOS transistors 360 and 370 are multiples of the transconductances of the second and first NMOS transistors and 340, respectively. Preferably, the same multiple is used for the transistor 360 and 370. Thus:

$$I_{360}=k*I_{330},$$

and $$I_{370} = k * I_{320}$$

The output PMOS transistors 380 and 390 of the load section are dial connected, so that the differential output is:

$$V_{OUT+} - V_{OUT-} = (I_{360} - I_{370}) g_{380}$$

where $G_{380}$ is the transconductance of the third PMOS transistor 380 and the fourth PMOS transistor 390. Accordingly, the voltage gain $A_V$ of the pre-amplifier 240 is:

$$A_V = (V_{OUT+} - V_{OUT-})/(V_{IN+} - V_{IN-})$$
$$= k * (g_{320}/g_{380})$$

Furthermore, the transconductance g of a PMOS transistor having a width w and a length 1 and biased at a current I is:

$$g = (2 * K'_P * I * (w/l))^{1/2}$$

where $K'_P$ is the manufacturing process-dependent tranconductance parameter for the PMOS transistors 320, 330, 380 and 390. Finally, the bias currents in the pre-amplifier 240 for the first and second PMOS transistors 320 and 330 are $I_B/2$. The bias currents in the pre-amplifier 40 for the third and fourth PMOS transistors 380 and 390, supplied through the common voltage terminal, are $k * I_B/2$. Thus, the gain $A_V$ for the pre-amplifier 240 is:

$$A_V = k * [(2 * K'_P * I_B (w_{320}/l_{320}))/(2 * K'_P * k * (I_B/2) * (w_{380}/l_{380}))]^{1/2}$$
$$= [(2 * k * (w_{320}/l_{320}))/(w_{380}/l_{320})]^{1/2}$$

Thus, the gain $A_V$ of the pre-amplifier 240 is independent of the transconductance parameter $K'_P$, which is highly depended upon the uncontrollable variable manufacturing process parameters which occur during manufacturing of the PMOS transistors 320, 330, 380 and 390. It should also be appreciated that the first and second PMOS transistors 320 and 330 can be formed of multiple transistors that can be switched in and out of the circuit forming the preamplifier 240 to create various gain settings.

The sample and hold delay circuit 250 comprises a D-type flip-flop 253, a driver 256, and a Schmitt trigger 258. The D input of the D-type flip-flop 253 is connected to the control signal line 203 from the control/timing circuit 200. The clock input for the D-type flip-flop 253 is connected to the signal line 202, which inputs the synchronization signal from the control/timing circuit 200. The driver 256 is connected between the Q output of the D-type flip-flop 253 and the signal line 252. The input of the Schmitt trigger 258 is connected to the input signal line 162, while the output of the Schmitt trigger 258 is connected to the signal line 254.

The RC timing circuit 160 comprises a resistor 164 and a capacitor 166. The resistor 164 is connected between the input signal line 252 from the driver 256 and the output signal line 162, which is connected to the Schmitt trigger 258. The capacitor 166 is connected between the output signal line 162 and ground. Thus, when an output signal is output from the driver 256 on the signal line 252 to the RC timing circuit 160, the signal on the output signal line 162 from the RC timing circuit will rise as the decaying exponential based on the resistance of the resistor 164 and the capacitance of the capacitor 166. In particular, the resistance of the resistor 164 and the capacitance of the capacitor 166 will be selected such that the delay generated by the RC timing circuit 160 is within a predetermined interval of the time when the drive signals are input to the transducer 130 from the drivers 222, as described below.

The output from the Schmitt trigger 258 on the signal line 254 is used as a control signal by the sample and hold circuit 260. In particular, the signal line 254 is connected to switches 265 and 266 of the sample and hold circuit 260. One pole of the switch 265 of the sample and hold circuit 260 is connected to the input line 242. The other pole of the switch 265 is connected to the output line 262. Similarly, one pole of the switch 266 is connected to the input signal line 244, while the other pole of the switch 266 is connected to the output signal line 264. A first capacitor 267 is connected between the output signal line 262 and ground, while a second capacitor 268 is connected between the signal line 264 and ground.

When the switches 265 and 266 of the sample and hold circuit 260 are closed, the input signals received on the input signal lines 242 and 244 are passed through the switches 265 and 266 to the output lines 262 and 264. Simultaneously, the capacitors 267 and 268 are charged. Then, when the switches 265 and 266 are opened, the voltage amplitudes on the signal lines 264 and 266 are held to the voltages stored on the capacitors 267 and 268, respectively. Then the voltages held by the capacitors 267 and 268 are input and demodulated by the demodulator 270.

Figure 1:
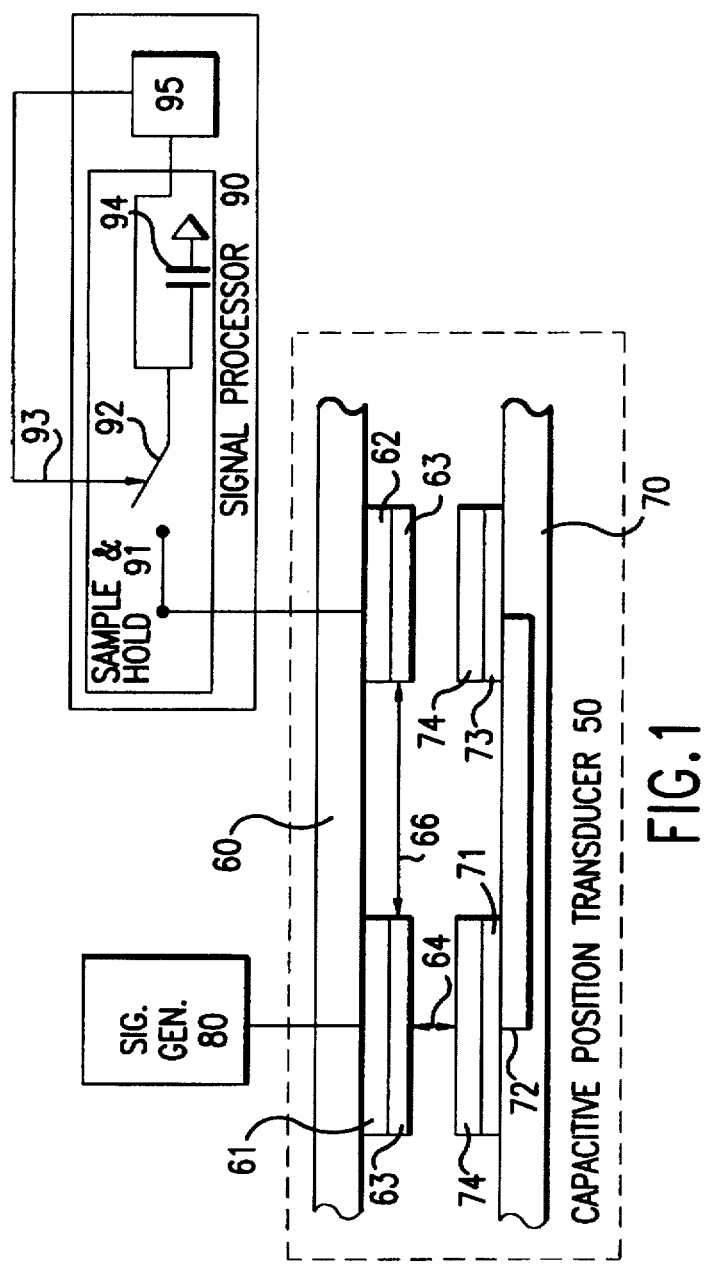
FIG. 1 schematically shows a conventional capacitive position transducer and signal processor.

Referring back to FIG. 6, the output signal $O_6$ generally corresponds to the output signal output by the second receiver electrode 62 of the capacitive position transducer 50 shown in FIG. 1 when no contamination is present between the slide 60 and the scale 70. In contrast, the signal $O_4$ corresponds to the output signal output by the second receiver electrode 62 of the capacitive position transducer 50 when a contaminant that does not increase the initial output voltage but does cause a voltage loss over time is present between the slide 60 and the scale 70.

Figure 6:
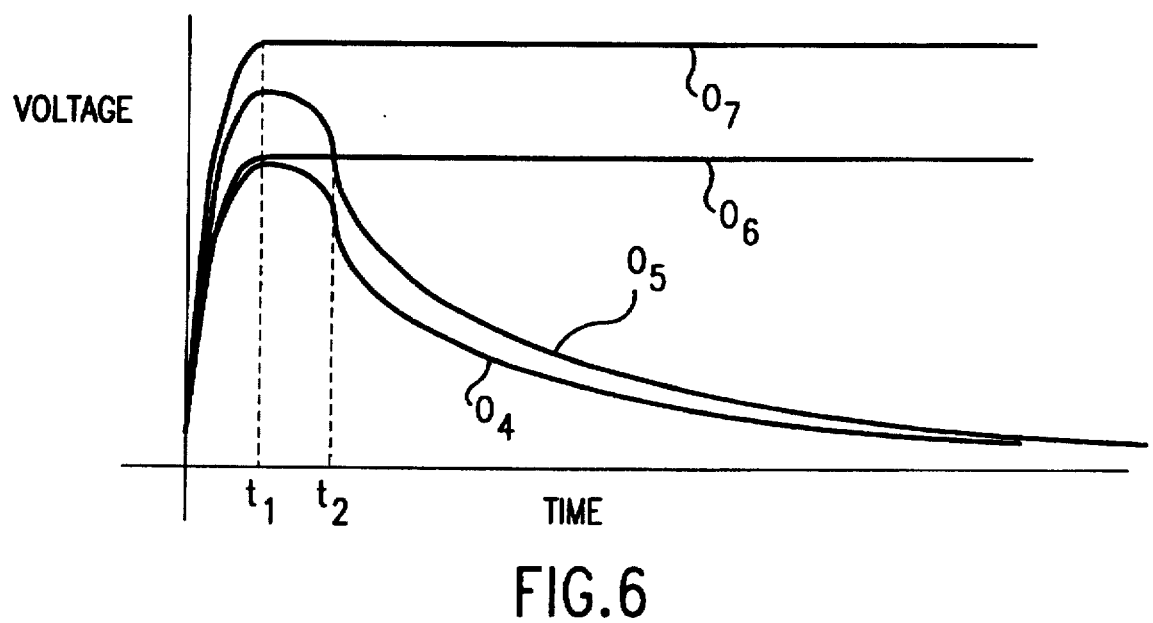
FIG. 6 shows output signals output from an uncontaminated and the three differently contaminated capacitive position transducers.

As also shown in FIG. 6, there is only a short interval after time $t_1$ during which the amplitude of the contaminant-affected output signal $O_4$ closely approaches the contaminant-free output signal $O_6$. That is, if the sample is not taken until time $t_2$, the voltage loss of the contaminant-affected output signal $O_4$ will increase significantly. Thus, the sample must be taken by the sample and hold circuit 260 at approximately the time $t_1$ corresponding to the closest approach of the contaminant-affected output signal $O_4$ to the contaminant-free output signal $O_6$. Thus, by using a short delay time (i.e., fast sampling) with the sample and hold circuit 260, the measurement errors will be greatly reduced.

In contrast, when the contaminants between the slide 60 and the scale 70 increase the initial output voltage but cause no voltage loss over time, controlling the sampling speed will have no effect. For example, as shown in FIG. 6, the output signal $O_7$ corresponds to the presence of a contaminant between the slide 60 and the scale 70 that increases the initial output voltage but causes no voltage loss over time.

Thus, as shown in FIG. 6, the contaminant-affected output signal $O_7$, like the contaminant-free output signal $O_6$, has a steady-state amplitude level after the time $t_1$. Accordingly, the difference in the amplitude levels between these two output signals will be constant after time $t_1$. Thus, controlling the sampling speed will not have any effect on the measurement error in this situation.

Finally, the output signal $O_5$ corresponds to the output signal generated when the contaminant present between the slide 60 and the scale 70 both increases the initial output voltage and causes a voltage loss over time.

In this case, while fast sampling will not reduce measurement errors due to initial voltage increases, fast sampling will reduce errors due to evenly distributed contaminants.

The voltage losses over time shown in output signals $O_4$ and $O_5$ are due to charge leakage between adjacent first transmitter electrodes 61 formed on the slide 60 and charge leakage between adjacent first receiver electrodes 71 on the scale 70.

Figure 9:
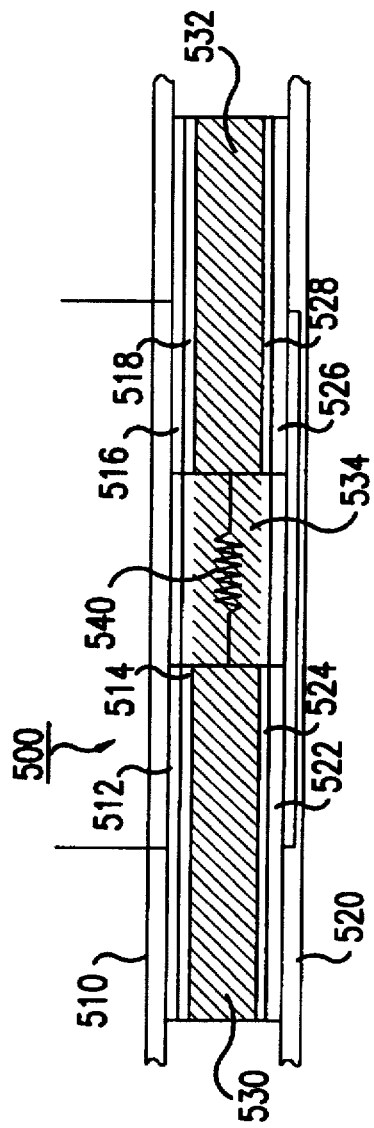
FIG. 9 schematically shows the capacitive position transducer contaminated with a resistive contaminant and the resulting equivalent electric circuit.

FIG. 9 shows a portion 500 of the capacitive position transducer. As shown in FIG. 9, the portion 500 includes a slide 510 and a scale 520. A pair of slide electrodes 512 and 516 are formed on the slide 510. Insulating layers 514 and 518 are formed over the slide electrodes 510 and 516, respectively. Similarly, a pair of scale electrodes 522 and 526 are formed on the scale 520. Insulating layers 524 and 528 are formed over the scale electrodes 522 and 526, respectively.

A first resistive contaminant 530 fills the gap between the insulating layers 514 and 524. A second resistive contaminant 532 fills the gap between the insulating layers 518 and 528. A third resistive contaminant 534 extends between the first and second contaminants 530 and 532. The third resistive contaminant 534 forms a resistor 540 having a resistance $R_2$. Thus, when the capacitive position transducer is in operation, the first-third contaminants 530–534 form a conductive sheet.

Therefore, when a voltage $V_1$ is supplied to the slide electrode 512, a voltage of $V_{1A}$ is induced in the first resistive contaminant 530. Similarly, when a second voltage $V_2$ is supplied to the second slide electrode 516, a voltage $V_{2A}$ is induced in the second resistive contaminant 532. If the voltages supplied to the slide electrodes 512 and 516 have different values, then the voltages induced in the first and second resistive contaminants 530 and 532 will necessarily have different values. As a result, current will flow through the resistor 540 formed by the third resistive contaminant 534. In particular, the current will flow from the first or second resistive contaminant 530 or 532 having the higher electric potential to the first or second resistive contaminant 530 or 532 having the lower electric potential.

As shown in FIG. 9, the resistance $R_2$ of the resistor 540 is based on the conductivity of the first-third resistive contaminants 530, 532 and 534, the dimensions of the slide and scale electrodes, the edge-to-edge separation distance between adjacent ones of the slide electrodes or the scale electrodes, and the gap between the insulating layers 514/518 on the slide electrodes and the insulating layers 524/528 on the scale electrodes.

In particular, the charge leakage shown in FIG. 9 between the electrodes on the scale or the slide distorts the voltages supplied to the slide or scale electrodes. In particular, the distortion is a lateral smear. Thus, the spatial input pattern that is fundamental to the operation of the capacitive position transducer is destroyed. The fast sampling method of this invention involves sampling the output of the capacitive position transducer 130 shown in FIG. 7 within a specific time period after the start of new input pulse input from the drivers 222 over the signal lines 224 to the transducer 130.

Thus, the "frequency" of the fast sampling method of this invention refers to the elapsed time from the start of a new input pulse to the time at which the sample is taken. Thus, a fast sampling frequency of 5 MHz indicates that the voltages measured $1/(2p5*10^6)$ seconds (=32 ns) after the beginning of each new input signal. It should be appreciated, however, that the fast sampling frequency has no relation to the frequency of the input signal.

In the fast sampling method of this invention, the less time that elapses after the start of the input signal before the output signal sample, the less that signal will decay from its initial output amplitude. Consequently, as the time lapse between the start of the input signal and the time the output signal is sampled decreases, the potential for measurement errors due to conductive contamination effects decreases. It should be appreciated that uneven dielectric effects are being ignored.

Figure 2:
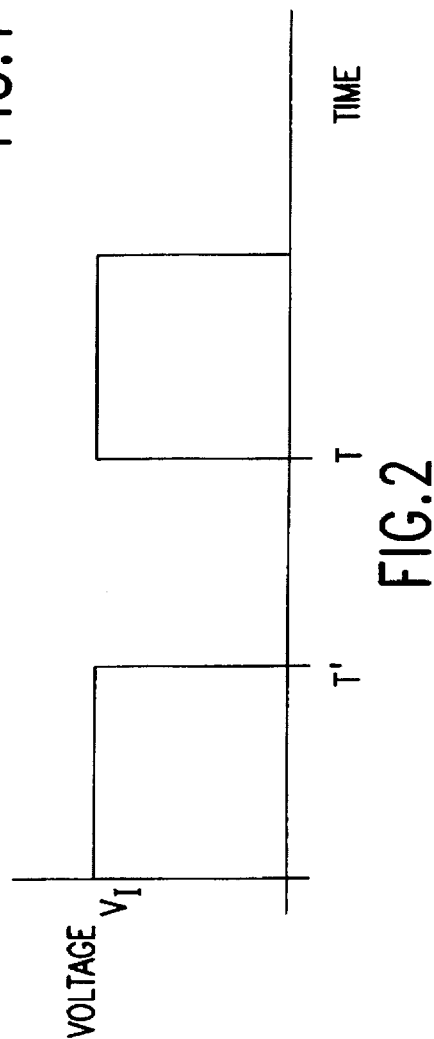
FIG. 2 shows an input signal to the capacitive position transducer.

In an alternate input signal generating method, rather than the square wave shown in FIG. 2, a continuous sine wave, i.e., a radio frequency (RF) signal, may be input to the transducer 130. Under the radio frequency method of this invention, as the frequency of the input signal increases, the capacitive impedance is reduced relative to the conductive impedance. Thus, the measurement errors due to conductivity correspondingly decrease. Furthermore, as the sample delay time decreases under the fast sampling method of this invention, or as the frequency of the input signal increases under the radio frequency method of this invention, the signal contrast, i.e., the signal-to-noise ratio, increases. In particular, signal contrast is defined in this invention as the amplitude of the portion of the output signal that varies as the slide is moved relative to the scale, divided by the average signal amplitude of the output signal.

The increase in the signal contrast is due to the increased reliance on the high frequency signal components in both the fast sampling and the radio frequency methods of this invention. That is, in the circuit model shown in FIG. 9, the high frequency signal components are associated with a lower capacitive impedance in the circuits. As the effective input frequency increases, the impedance of the capacitors decreases. Thus, as the input frequency is increased in the radio frequency method, or as the transient "edge" of a pulse input is emphasized by short sample delay time in the fast sampling method of this invention, the capacitive effects predominate the resistive effects. Thus, the conductive/resistive elements in the conductive contamination become insignificant to the operation of the capacitive position transducer 130.

Figure 3:
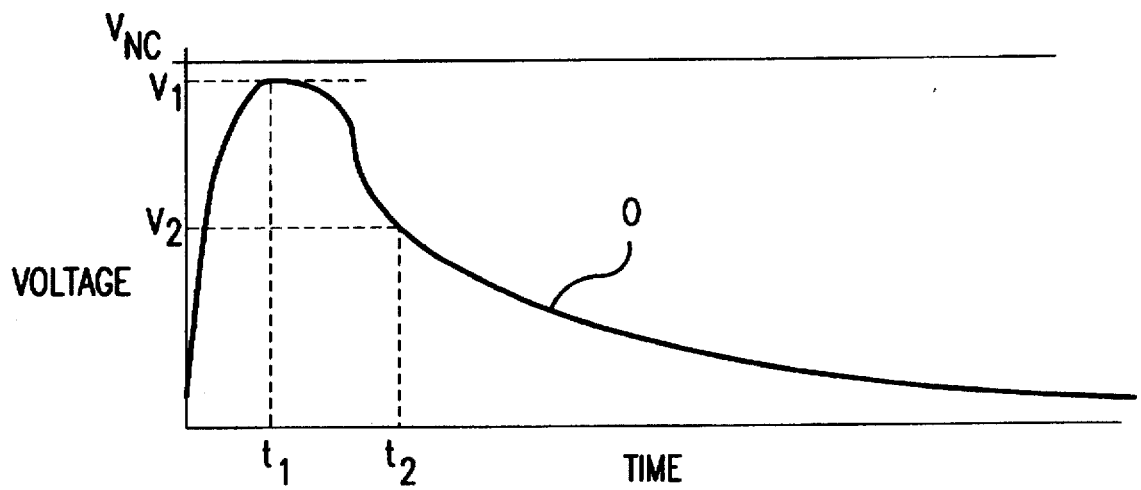
FIG. 3 shows an output signal output from the capacitive position transducer when contamination is present.
Figure 4:
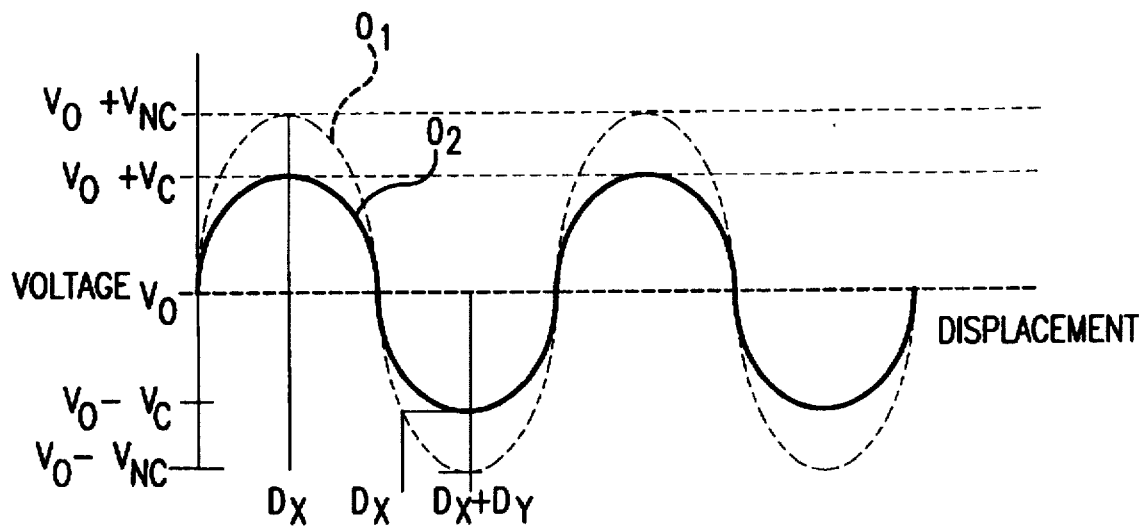
FIG. 4 shows output signals relative to the position of the slide on the scale for an uncontaminated and a uniformly contaminated capacitive position transducer.
Figure 5:
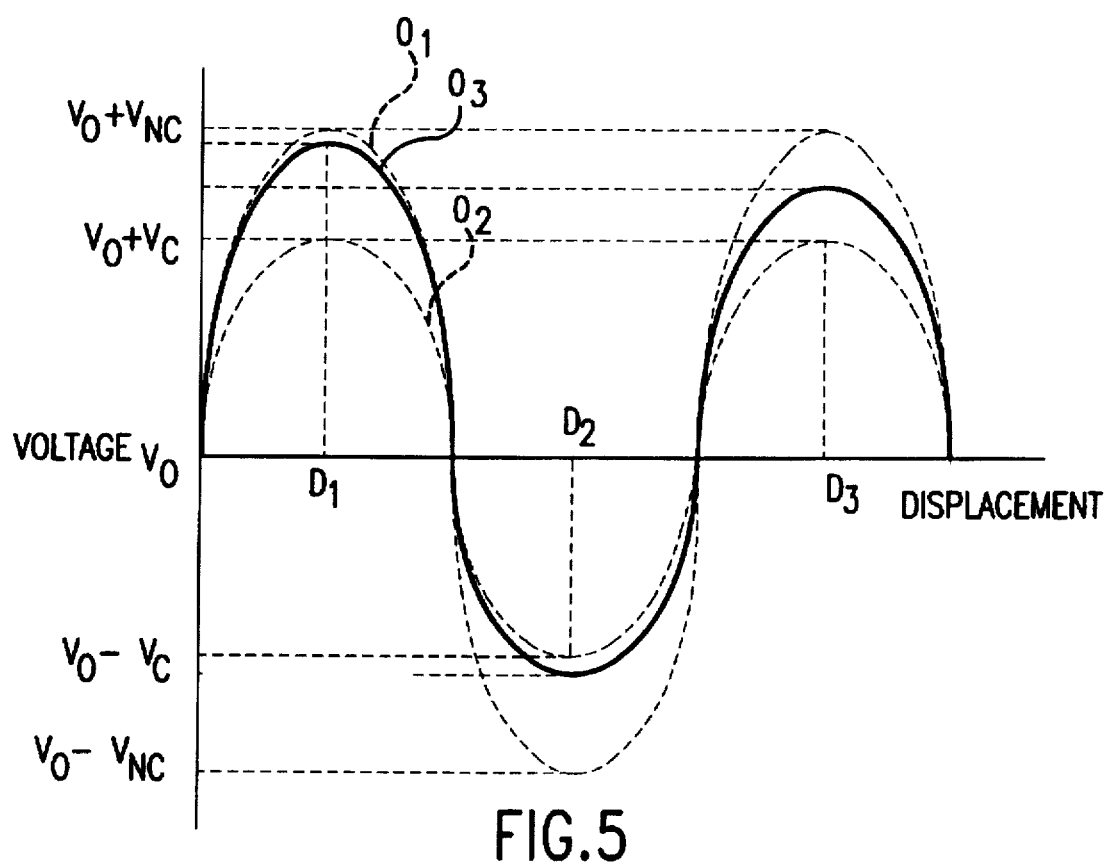
FIG. 5 shows output signals relative to the position of the slide on the scale for an uncontaminated and an unevenly contaminated capacitive position transducer.

In particular, the rate of decay of the output signals, as shown in FIGS. 3 and 6, is based on the resistances R of the resistors and capacitances C in the model of the transducer shown in FIG. 9. Thus, the primary physical characteristics related to the signal decay are: 1) the type and quantity of the contaminants; 2) the spacing distance 64 between the scale and the slide; and 3) the edge-to-edge spacing of the electrodes on the slide and scale.

In general, the resistance of the contamination present between the slide and scale of the capacitive position transducer 130 is based both upon the dimensions of the contamination and the resistivity of the material comprising the contamination. While it should be appreciated that fluids are significantly more complicated than this, this is a useful approximation. Thus, for a capacitive position transducer 130 having a given geometry, a contaminant formed by a material having a low resistivity will generally have a lower total resistance. Furthermore, because a greater amount of current flows through an object having little or no resistance for any given period of time, the rate of signal decay will increase as the resistivity of the contaminant decreases.

Figure 10:
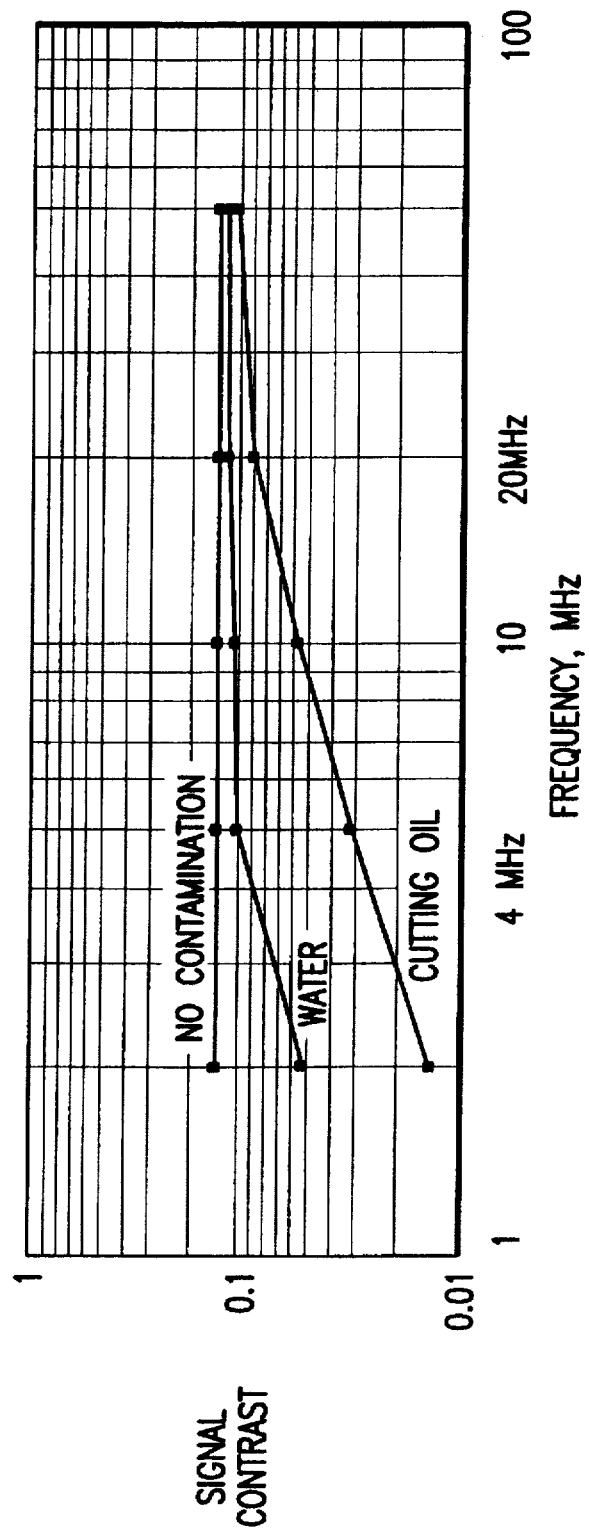
FIG. 10 shows the relationship between the sampling frequency and the signal contrast for different contaminants.

FIG. 10 shows the signal contrast for a capacitive position transducer 130 which is not contaminated, and one which is contaminated with each of water and cutting oil. In general, the resistivity of the cutting oil is lower than the resistivity of water, which in turn is lower than the resistivity of air in the gap of the uncontaminated transducer. As shown in FIG. 10, the signal contrast for air is greater for all frequencies than the signal contrast for water, which is greater for all frequency than signal contrast for cutting oil. However, the signal contrast for both water and cutting oil increases as the sampling frequency increases (i.e., the sampling time decreases).

In the circuit shown in FIG. 9, increasing the gap increases the cross-sectional area of the first-third contaminants 530–534 present between the adjacent electrodes 512 and 516. This, in turn, lowers the effective resistance of the contaminant 534. This further results in more current passing through the contaminant 534 between the adjacent electrodes 512 and 516. Thus, increasing the gap generally increases the rate of signal decay.

Figure 11:
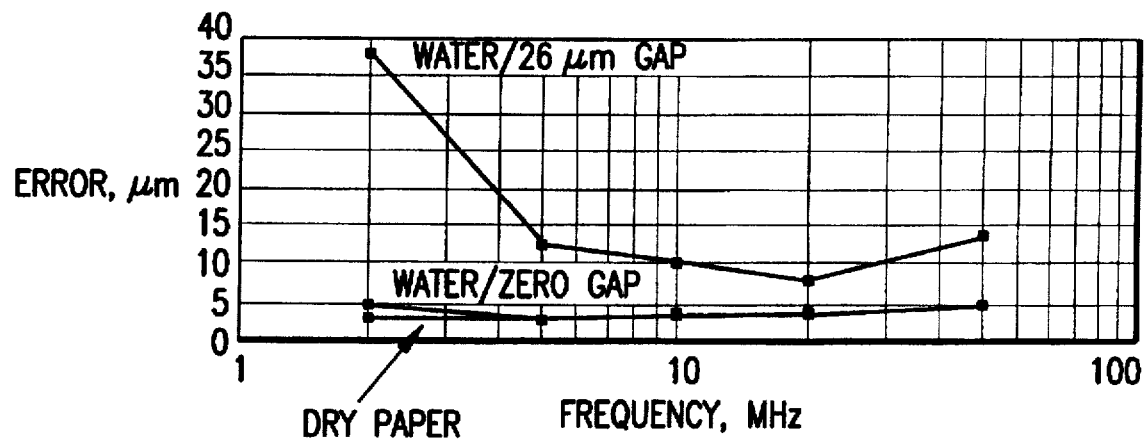
FIG. 11 shows the relationship between the sampling frequency and the measurement error for different gap sizes.

As shown in FIG. 11, this effect of the gap size on the signal decay rate has been experimentally confirmed. FIG. 11 shows the measurement error occurring when the capacitive position transducer 130 is contaminated with water for two different gap distances. As shown in FIG. 11, when the gap distance is essentially zero, even if the capacitor is contaminated with water, the error is generally low and essentially insensitive to changes in the sampling frequency. In contrast, when the gap is 26 microns, the error measurement at low frequencies is quite large. The measurement error then decreases rapidly as the sampling frequency increases until it is generally constant at about a sampling frequency of 5 MHz or above.

Thus, at all frequencies, the measurement errors were higher for a gap of 26 microns, resulting in a lower signal contrast. Furthermore, the signal decay effects are insignificant at the higher sampling frequencies. Therefore, the difference in errors at the higher frequencies is largely attributed to mechanisms not related to signal decay, such as loss in the signal and uneven distribution of the contaminants. However, these mechanisms are known to have a relatively constant effect on measurement error throughout various input frequencies.

Figure 12:
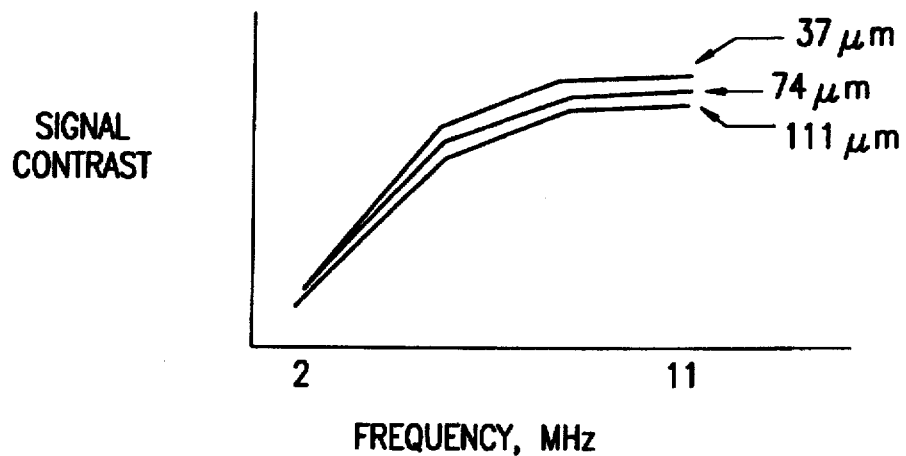
FIG. 12 shows the relationship between the sampling frequency and the signal contrast for different thicknesses of the insulating layers.

FIG. 12 shows the signal contrast of the output signal as a function of frequency for various thickness of the insulative layers formed on the scale and slide electrodes. As shown in FIG. 12, the signal contrast is generally insensitive to the thickness of the insulating layers on the slide and scale electrodes. However, as shown in FIG. 12, the signal contrast remains highly dependent upon the sampling frequency, increasing significantly as the sampling frequency increases from 2 MHz to 11 MHz.

As discussed above with respect to FIG. 9, the contaminant 534 present between adjacent slide electrodes 512 and 516 acts as a resistive element connecting these electrodes. Thus, by increasing the edge-to-edge distance between the electrodes, the dimensions of the contaminant 534 will increase. This increases the resistance $R_2$ of the resistor 540 formed by the contaminant 534. Since the signal decay rate decreases as the resistance of the resistor 540 formed by the contaminant 534 increases, increasing the edge-to-edge distance between adjacent electrodes decreases the signal decay rate.

Figure 13:
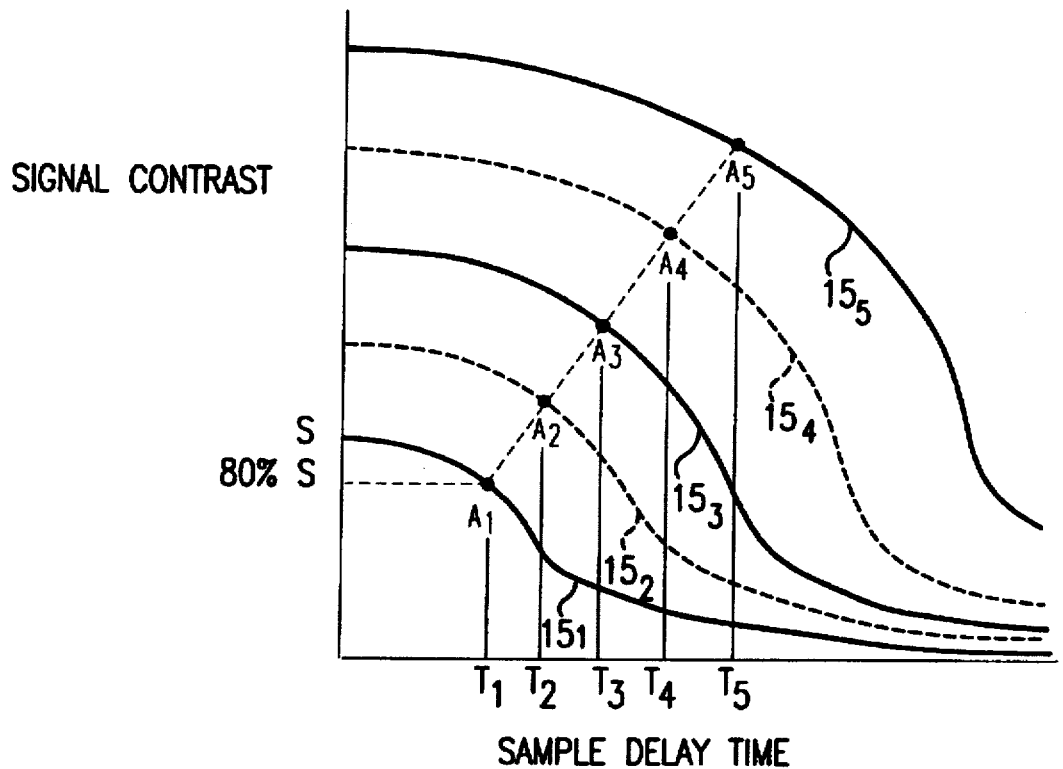
FIG. 13 shows the relationship between the sample delay time and the signal contrast for a variety of different gap sizes and electrode separation distances.

FIG. 13 shows a number of curves for a certain contaminant, relating the sample delay time in (nanoseconds) to the signal contrast obtained for the output signal output from the second transmitter electrodes of the capacitive position transducer 130. As shown in FIG. 13, the curve $15_1$ represents the resulting signal contrast for a plurality of sample delay times for a contaminated capacitive position transducer 130 where the scale is separated from the slide by a first gap distance and the slide electrodes are separated by a first separation distance.

As shown in FIG. 13, the signal contrast $S_M$ represents the maximum signal contrast of the contaminated output signal at a sample delay time of 0 seconds. Point $A_1$ on the curve $15_1$ represents a point where the signal contrast is 80% of the original value $S_M$. Curve $15_2$ shows the relationship between the sample delay time and the signal contrast when the gap distance has been reduced from the first gap distance used to produce curve $15_1$ to a second gap distance. Point $A_2$ on the curve $15_2$ also represents the point on the curve $15_2$ where the signal contrast is 80% of its original value.

Curve $15_4$ shows the relationship between the sample delay time and the signal contrast when the gap distance is again reduced from the second gap distance to a third gap distance. As shown in FIG. 13, the point $A_4$ on the curve $15_4$ also indicates the point on the curve $15_4$ where the signal contrast is 80% of its original value.

As shown by curves $15_1$, $15_2$ and $15_4$, as the gap distance decreases, the sample delay time, at which a signal contrast which is 80% of its original value can be obtained, increases. In particular, the sample delay time increases from the time $T_1$ for the first gap distance to the time $T_2$ and then to the time $T_4$ as the gap distance decreases.

Similarly, the curves $15_3$ and $15_5$ relate the sample delay time to the signal contrast as the separation distance between the electrodes on the slide increases. In particular, the separation distance for curve $15_5$ is greater than the separation distance for the curve $15_3$, which in turn is greater than the separation distance for the curve $15_1$. The points $A_3$ and $A_5$ on the curves $15_3$ and $15_5$, which indicate that the signal contrast is 80% of its original value, show that the sample delay time can increase from the time $T_1$ for curve $15_1$ to the time $T_3$ for the curve $15_3$ and to the time $T_5$ for the curve $15_5$.

Thus, the curves $15_1$–$15_5$ relate the three factors affecting the signal contrast, the gap distance 64, the separation distance 66 and the sample delay time, such that, for a selected desired signal contrast level, setting two of the three factors allows the third to be determined.

Figure 14:
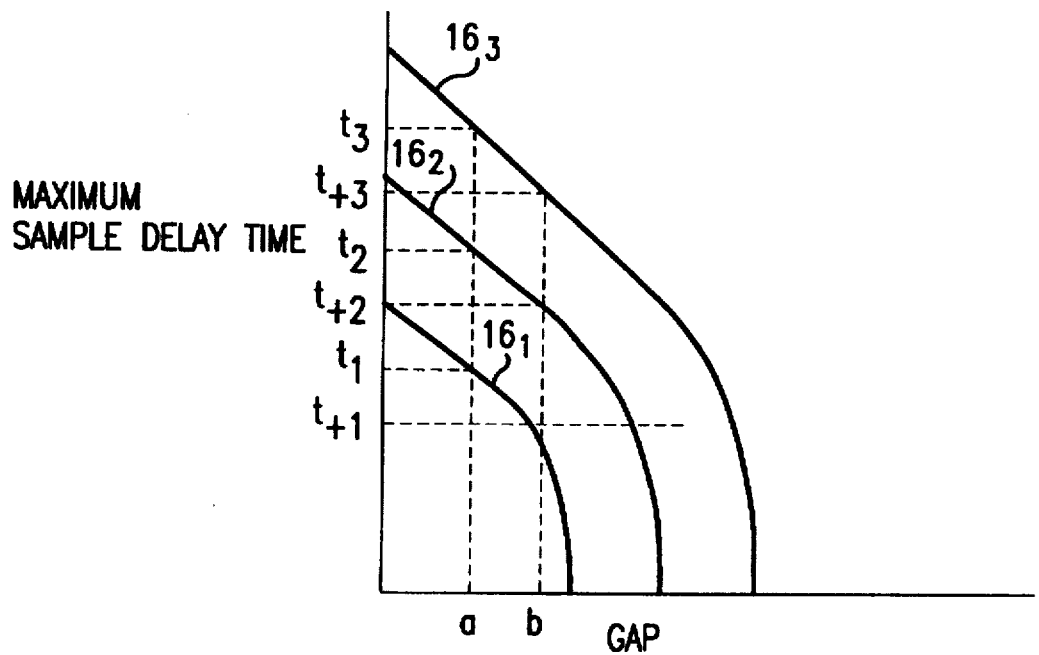
FIG. 14 shows the relationship between the gap size and the maximum sample delay time necessary to obtain at least 80% of the maximum signal contrast of the output signal.

For example, FIG. 14 shows the relationship between the gap distance 64 and the sample delay time for a plurality of separation distances 66, assuming a signal contrast of 80%. In FIG. 14, the separation distance 66 for the curve $16_3$ is greater than that for the curve $16_2$, which in turn is greater than that for the curve $16_1$. Thus, for a selected gap distance, the maximum sample delay time increases from a time $t_1$ to a time $t_3$ as the separation distance increases. In contrast, if the gap between the slide and the scale increases, the maximum sample delay time for each of the different separation distances between the slide electrodes decreases from the times $t_1$–$t_3$ for the curves $16_1$–$16_3$ to the times $t_{-1}$–$t_{-3}$ for the curves $16_1$–$16_3$. For example, for a capacitive position transducer having slide electrodes separated by a separation distance of 0.147 millimeter and a sliding gap uniformly filled with cutting oil having a resistivity constant of 280W-cm, to obtain a sample having a signal contrast of at least 80% of the original value, the maximum sample delay time is 31 ns.

Figure 15:
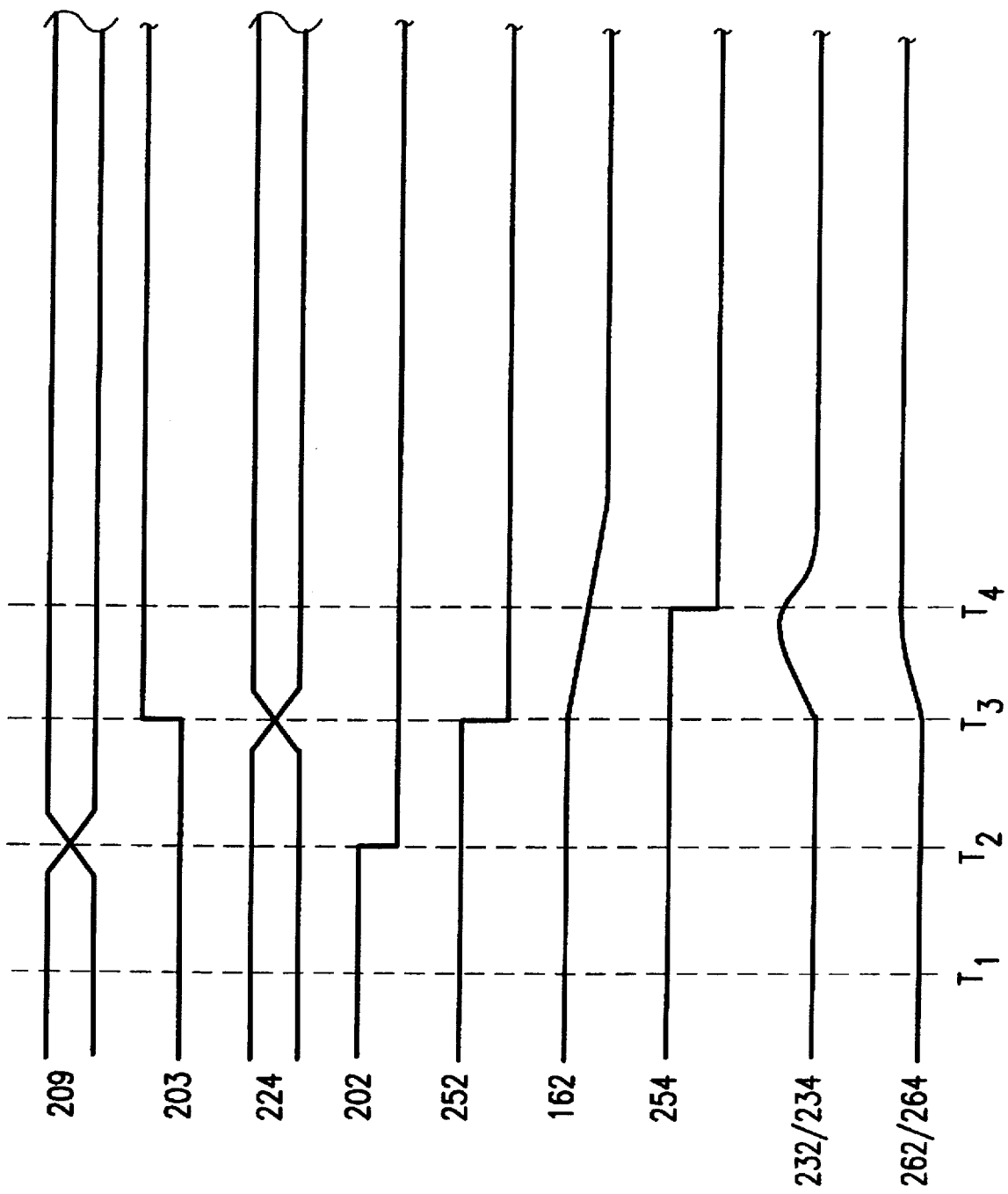
FIG. 15 is a timing diagram for the signal generating and processing circuit shown in FIGS. 7 and 8.

The timing of the various signals output by the control/timing circuit 200, the drivers 222, the sample and hold delay circuit 250, the pre-amplifier 240, the RC timing circuit 160 and the sample and hold circuit 260 are shown in FIG. 15. As shown in FIG. 15, at time $T_1$, the pulse data output on the signal lines 209 from the control/timing circuit 200 is the pulse data output during the previous cycle. Furthermore, at some previous time, the synchronization signal on the signal line 202 was cycled from low to high and back to low while the delay signal on the control line 202 was set to high, thus setting the signal on the output signal line 252 and the output signal lines 162 and 254 to high. Because the signal on the signal line 254 is high, the switches 265 and 266 of the sample and hold circuit 260 are closed.

Next, at time $T_2$, the pulse data output from the control/timing circuit 200 to the ROM 220 on the signal lines 209 is changed to the pulse data appropriate for the next drive cycle of the transducer 130. At the same time, the delay signal output from the control/timing circuit 200 on the signal line 202 to the D input of the D-type flip-flop 253 is set to low. Then, at time $T_3$, the synchronization signal output from the control timing circuit 200 to the drivers 222 and the clock input of the D-type flip-flop 253 is set to low. Thus, the drive signals output from the drivers 222 on the signal lines 224 to the transducer 130 changes to new data. At the same time, the Q output of the D-type flip-flop 253 changes to the value of the D input, i.e., low. Accordingly, the capacitor 166 of the RC timing circuit 160 begins to discharge.

At time $T_4$, the voltage on the output signal line 162 from the RC timing circuit 160 to the Schmitt trigger 258 drops sufficiently such that the output of the Schmitt trigger 258 output on the signal line 254 changes from high to low. This opens the switches 265 and 266 of the sample and hold circuit 260.

Concurrently, the amplified transducer output signals output on the signal lines 232 and 234 began rising at time $T_3$. Due to contamination in the transducer 130, the amplified transducer output signals peak and begin decaying. Thus, the time $T_4$ should be between 25 ns and 35 ns after the time $T_3$ to ensure that the switches 265 and 266 are opened as close to the peak of the amplified transducer output signals as possible. It should also be appreciated that the drivers 222 need to drive the transducer 130 with a typical rise time of at most 8 ns.

While the present invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention is defined in the following claims.

What is claimed is:

1. A method for operating a capacitive position transducer, comprising:

supplying an input signal to an input of the capacitive position transducer at a first time;

outputting an output signal from the capacitive position transducer, the output signal based on the input signal and a relative position between a first member and a second member of the capacitive position transducer; and sampling the output signal within a predetermined time interval of the first time, wherein the output signal, in the absence of contamination, has a first signal contrast at the predetermined time interval;

wherein the predetermined interval is selected to obtain a sampled output signal having at least a selected signal contrast relative to the first signal contrast when the capacitive position transducer is not free of contaminants.

2. The method of claim 1, wherein the selected signal contrast relative to the first signal contrast is 80% of the first signal contrast.

3. The method of claim 1, wherein the predetermined interval for sampling the output signal is at most 32 ns.

4. A method for determining, for a capacitive position transducer, a sampling delay interval after an input signal is input to the capacitive position transducer, the method comprising:

determining a gap distance between a first member and a second member of the capacitive position transducer;

determining a separation distance between driver electrodes on one of the first member and the second member;

determining a desired minimum proportion of a signal contrast of a sampled output signal of the capacitive position transducer relative to a maximum signal contrast of the output signal; and determining the sample delay interval based on the determined gap distance, the determined separation distance, and the determined desired minimum proportion of the signal contrast for the output signal.

5. The method of claim 4, wherein the determined desired minimum proportion of the signal contrast is sufficiently high that the sampled output signal, when sampled after the determined sampling delay interval, accurately indicates a position of the first member relative to the second member within a desired accuracy.

6. The method of claim 5, wherein the determined desired minimum proportion is 80% of the maximum signal contrast of the output signal.

7. The method of claim 5, wherein the desired accuracy is within at most 20 µm of an actual position of the first member relative to the second member.

8. The method of claim 5, wherein the desired accuracy is within at most 10 µm of an actual position of the first member relative to the second member.

9. The method of claim 5, wherein the desired accuracy is within at most 5 µm of an actual position of the first member relative to the second member.

10. The method of claim 4, wherein the determined sampling delay interval decreases as the determined gap distance increases.

11. The method of claim 4, wherein the determined sampling delay interval increases as the determined separation distance increases.

12. The method of claim 4, wherein the determined sampling delay interval decreases as the desired proportion of the signal contrast for the output signal increases.

13. A measurement system, comprising:

a capacitive position transducer, comprising:

a first member, a second member movable relative to the first member along a measurement axis, and a plurality of first electrodes positioned on the first member along the measurement axis, and a plurality of second electrodes positioned on the second member along the measurement axis, the plurality of second electrodes variably capacitively coupled to the plurality of first electrodes as the first member moves relative to the second member based on a position of the first member relative to the second member;

a signal generator supplying input signals to the capacitive position transducer; and a signal processor inputting output signals from the capacitive position transducer, the output signals indicative of the position of the first member relative to the second member;

wherein the signal processor comprises a sampling circuit portion for sampling the output signals within a predetermined sampling time interval after corresponding input signals are supplied to the capacitive position transducer, the predetermined sampling time interval selected so that a signal contrast of the sampled output signals is at least a determined proportion of a maximum signal contrast of the output signals.

14. The measurement system of claim 13, wherein the determined proportion is 80% of the maximum contrast of the output signals.

15. The measurement system of claim 13, wherein the determined proportion of the signal contrast is sufficiently high that the sampled output signals accurately indicate the position of the first member relative to the second member.

16. The measurement system of claim 15, wherein the sampled output signals indicate the position of the first member within 20 μm of an actual position of the first member relative to the second member.

17. The measurement system of claim 15, wherein the sampled output signals indicate the position of the first member within 10 μm of an actual position of the first member relative to the second member.

18. The measurement system of claim 15, wherein the sampled output signals indicate the position of the first member within 5 μm of an actual position of the first member relative to the second member.

19. The measurement system of claim 15, wherein the predetermined sampling time interval is 31 ns.

20. A capacitive position transducer, comprising:

first and second support members, the first and second support members displaceable relative to each other, at least one of the first and second support members displaceable relative to a measurement axis;

a first set of electrodes positioned on the first support member;

a second set of electrodes positioned on the second support member, differing portions of the second set of electrodes coupled with the first set of electrodes based on the position of the first supporting member relative to the second support member, the first and second sets of first electrodes forming an operable set of transducer electrodes;

an electronic circuit connected to at least one of the first and second sets of electrodes, the electronic circuit supplying signals to and receiving signals from at least one of the first and second sets of electrodes to indicate the relative position between the first and second support members as a function of the coupling between the first and second sets of electrodes;

wherein the electronic circuit includes a contamination resistant signal sampling circuit, the contamination resistant signal sampling circuit sampling the signal received from the at least one of the first and second sets of electrodes within a prescribed time interval after the supplied signal, wherein any signal decay effects in the signal paths of signals transferred between the first and second sets of electrodes leave said relative position indication substantially unaffected.

21. The capacitive position transducer of claim 20, wherein the prescribed time interval is at most 30 nanoseconds so as to be resistant to cutting fluids when the first and second sets of electrodes are separated by a sliding gap, adjacent electrodes of the first set of electrodes being separated by a distance of 0.147 mm.

22. The capacitive position transducer of claim 21, wherein the signal contrast of the output signal is sufficiently high for the electronic circuit to accurately determine the relative position between the first and second sets of electrodes.

23. The capacitive position transducer of claim 21, wherein the prescribed time interval increases as a distance between the first and second set of electrodes decreases.

24. The capacitive position transducer of claim 21, wherein the prescribed time interval decreases as the distance between the first and second set of electrodes increases.

25. The capacitive position transducer of claim 21, wherein the prescribed time increases as a separation distance between adjacent electrodes of the first set of electrodes increases.

26. The capacitive position transducer of claim 21, wherein the prescribed time decreases as a separation distance between the electrodes of the first set of electrodes decreases.

27. The capacitive position transducer of claim 21, wherein the prescribed time increases as a resistivity constant of the contaminant increases.

28. The capacitive position transducer of claim 21, wherein said prescribed time decreases as a required signal contrast of the output signal increases.

29. The capacitive position transducer of claim 21, wherein the prescribed time increases as a required contrast of the output signal decreases.

* * * * *